С
3,171,716
PROCESS FOR THE PRODUCTION OF AMMONIUM NITRATE OF LOW HYGROSCOPICITY AND HIGH BULK DENSITY
Heinrich Diekmann, Ludwigshafen (Rhine), Karl Opp, Heidelberg, Herbert Roos, Munich, and Hans Schulz, Ludwigshafen (Rhine), Germany, assignors to Badische Anilin- & Soda-Fabrik Aktiengesellschaft, Ludwigshafen (Rhine), Germany
No Drawing. Filed July 25, 1961, Ser. No. 126,523
Claims priority, application Germany, Aug. 11, 1960, B 58,930
1 Claim. (Cl. 23—103)

This invention relates to a process for the production of ammonium nitrate of low hygroscopicity and high bulk density.

It is known that high percentage solid ammonium nitrate is being used in ever increasing amounts both for fertilizers and for the production of explosives.

A great disadvantage of ammonium nitrate is its marked hygroscopicity. By reason of this property, the salt rapidly becomes moist on storage, and deliquesces in a very short time. It must therefore be packed in sacks of close weave or stored loosely in very dry conditions, which is naturally very costly.

A further disadvantage is that prilled ammonium nitrate has a relatively low bulk density by reason of its rugged and porous structure and surface and therefore savings in transport and storage costs are limited.

Various processes are known by which the tendency of ammonium nitrate to agglomerate can be reduced. Thus, for example, the ammonium nitrate may be provided with a thin surface coating of a sulfonated aromatic dye, such as for example the calcium or ammonium salt of trisulfonated p,p,p-triaminotritolyl carbinol anhydride, the said coating being formed for example by crystallization of the ammonium nitrate from an aqueous solution of such a dye. In its crystal form IV, ammonium nitrate thus treated exhibits less tendency to agglomerate but such a treatment is almost ineffectual in cases where the ammonium nitrate is stored at temperatures above 32.3° C. since the ammonium nitrate is then present in crystal form III. Moreover, a highly colored product is always obtained, although only small amounts of dye are used.

According to another known process the disadvantage of coloration is avoided by crystallization of the ammonium nitrate from a solution which contains not less than 0.025% of a condensation product which is derived from 1 mole of formaldehyde and 2 moles of a monomethyl naphthalene monosulfonic acid, the latter being produced by sulfonation of 1-methyl-naphthalene and/or 2-methyl naphthalene with sulfuric acid within a temperature range of 40° to 165° C. Ammonium nitrate produced by this treatment exhibits both a reduced tendency to agglomerate and a low bulk density.

The addition of ammonium or sodium metaphosphate is also known to reduce the tendency to agglomerate. The addition of magnesium nitrate has also been proposed for the same purpose.

It is also known that the alterations in the crystal structure of ammonium nitrate brought about by temperature fluctuations, the consequent disintegration of the crystals and the tendency to agglomerate may be prevented by the addition of ammonium sulfate and ammonium phosphate.

We have now found that the hygroscopicity of ammonium nitrate may be lowered and its bulk density appreciably raised by adding to the ammonium nitrate sodium ions, phosphate ions and magnesium ions in the form of salts in such amounts that the content of $P_2O_5$ is at least 0.05%, preferably between 0.3 and 1%, and the contents of $Na_2O$ and $MgO$ each is at least 0.1%, preferably between 0.3 and 1%.

Whereas the structure and surface of prilled ammonium nitrate, as already mentioned, is rugged and porous without these additions, ammonium nitrate containing sodium ions, phosphate ions and magnesium ions in accordance with the present invention has a compact nature.

The sodium and phosphate ions may be added either in the form of tertiary sodium phosphate, secondary sodium phosphate or in the form of a mixture of other sodium salts or phosphates. As sodium salts there may be used, for example sodium nitrate, sodium chloride, sodium fluoride and sodium sulfate, individually or in admixture. Salts such as tertiary or secondary ammonium phosphate, dicalcium phosphate, tricalcium phosphate, magnesium hydrogen phosphate, or secondary and tertiary potassium phosphate are suitable as phosphates and may be used individually or in admixture. Magnesium ions are advantageously added in the form of magnesium nitrate $(Mg(NO_3)_2 \cdot 6H_2O)$. Magnesium sulfate, magnesium chloride and the like may also be used. Magnesium and phosphate ions may also be added by the addition of magnesium ammonium phosphate.

The said salts are advantageously added at any stage of the process prior to granulation. Thus, the salts may be added during neutralization of the nitric acid by ammonia or they may be added to the resultant ammonium nitrate solution before or after its concentration.

With the combination according to this invention the properties of the ammonium nitrate are improved to an extent which far exceeds that of a combined effect. This combination is apparent, for example, from the fact that with the addition of magnesium nitrate alone the hygroscopicity of ammonium nitrate is considerably increased as compared with a product without addition, whereas the addition of magnesium nitrate in conjunction with the other components mentioned above not only neutralizes this effect but considerably lowers the hygroscopicity of the ammonium nitrate. With regard to the bulk density, too, the effect attainable by the treatment according to our invention could not have been foreseen with the knowledge of the effect of the individual components.

The invention is illustrated by, but not limited to, the following examples.

*Example 1*

A 58% aqueous solution of ammonium nitrate is evaporated to about 97.5% in a vacuum evaporator and then granulated by prilling. By drying the granulate in a rotary dryer, the water content is reduced to about 0.5%. The bulk density of the salt is 800 to 820 g./l. When keeping the salt over a 20% sodium hydroxide solution, which is equivalent to a relative atmospheric humidity of 75%, the salt deliquesces after 12 days.

*Example 2*

9 m.³ of an about 97% aqueous ammonium nitrate melt (ammonium nitrate content 12.58 tons) is intensely mixed with 62.8 kg. of trisodium phosphate $$(Na_3PO_4 \cdot 12H_2O)$$

and 400 kg. of magnesium nitrate $(Mg(NO_3)_2 \cdot 6H_2O)$. 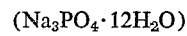
The mixture is granulated by prilling and dried in a rotary drum. The water content of the end product is about 1.4%. The bulk density of the dried salt is ascertained as 880 to 900 g./l. The salt deliquesces after 22 days at a relative atmospheric humidity of 75%.

*Example 3*

17.5 m.³ of an about 58% aqueous ammonium nitrate solution (ammonium nitrate content 12.58 tons) is mixed with 42 kg. of sodium nitrate, 28.5 kg. of dicalcium phosphate ($CaHPO_4 \cdot 2H_2O$) and 400 kg. of $Mg(NO_3)_2 \cdot 6H_2O$. The mixture obtained is evaporated in a vacuum evaporator to about 97% and granulated by prilling. After drying, the water content of the end product is about 1.3%. The bulk density of the dry salt is 940 g./l. When kept under the conditions specified in Example 1, the salt deliquesces after 19 days.

*Example 4*

9 m.$^3$ of an about 97% aqueous ammonium nitrate solution is mixed with 20.8 kg. of sodium fluoride, 28.7 kg. of secondary magnesium phosphate ($MgPO_4 \cdot 3H_2O$) and 400 kg. of magnesium nitrate ($Mg(NO_3)_2 \cdot 6H_2O$). The mixture is granulated by prilling and dried. The end product has a water content of about 1.3%. The dried product has a bulk density of 870 to 890 g./l. When kept under the conditions specified in Example 1, the salt deliquesces after 17 days.

*Example 5*

14.5 kg. of sodium chloride, 17.6 kg. of sodium sulfate, 13.2 kg. of diammonium phosphate, 12.8 kg. of tricalcium phosphate and 400 kg. of magnesium nitrate are added to 17.5 m.$^3$ of an about 58% aqueous ammonium nitrate solution. The mixture is evaporated to a concentration of about 97% by weight, granulated by prilling and dried in a rotary dryer to a water content of about 1.4%. The product has a bulk density of 890 to 910 g./l. The salt deliquesces after 19 days at an atmospheric humidity of 75%.

*Example 6*

17.5 m.$^3$ of an about 58% aqueous ammonium nitrate solution is mixed with 87.1 kg. of sodium sulfate, 24.2 kg. of secondary ammonium phosphate and 141.0 kg. of magnesium sulfate. After evaporation to about 97% by weight and granulation of the evaporated solution by prilling, the product is adjusted to a water content of 1.1% in a rotary dryer. The product has a bulk density of 900 to 920 g./l. The salt deliquesces after 20 days at an atmospheric humidity of 75%.

*Example 7*

124.7 kg. of sodium fluoride, 131.2 kg. of secondary sodium phosphate ($NaHPO_4 \cdot 12H_2O$), 186.5 kg. of secondary potassium phosphate and 241.7 kg. of magnesium nitrate ($Mg(NO_3)_2 \cdot 6H_2O$) are added to 17.5 m.$^3$ of an about 58% aqueous ammonium nitrate solution. By evaporation, prilling and drying a product is obtained with a water content of 1.2% and a bulk density of 930 to 940 g./l. The salt deliquesces after 20 days at an atmospheric humidity of 75%.

*Example 8*

9 m.$^3$ of an about 97% aqueous ammonium nitrate solution is mixed with 33.4 kg. of tertiary ammonium phosphate (($NH_4)_3PO_4 \cdot 3H_2O$), 44.9 kg. of tertiary potassium phosphate, 45.8 kg. of magnesium ammonium phosphate ($MgNH_4PO_4 \cdot 6H_2O$) and 693.2 kg. of magnesium nitrate ($MgNO_3)_2 \cdot 6H_2O$). After ganulation by prilling and drying, the product has a water content of 1.4% and a bulk density of 900 to 920 g./l. The salt deliquesces after 17 days at an atmospheric humidity of 75%.

*Example 9*

17.5 m.$^3$ of an about 58% aqueous ammonium nitrate solution is mixed with 57.3 kg. of sodium sulfate, 60.6 kg. of secondary calcium phosphate ($CaHPO_4 \cdot 2H_2O$) and 126.1 kg. of magnesium chloride ($MgCl_2 \cdot 6H_2O$). After evaporation to 97%, the product is granulated by prilling and dried. The bulk density is between 870 and 880 g./l. The salt deliquesces after 19 days when kept under the conditions specified in Example 1.

*Example 10*

9 m.$^3$ of an about 97% aqueous nitrate solution is mixed with 315.4 kg. of sodium nitrate, 214.0 kg. of secondary ammonium phosphate and 343.4 kg. of magnesium sulfate. After granulation by prilling and drying, the product has a water content of about 1.4% and a bulk density of 910 to 920 g./l. The salt deliquesces after 21 days at an atmospheric humidity of 75%.

What we claim is:

A process for the production by prilling of granulated ammonium nitrate of low hygroscopicity and high bulk density which comprises adding sodium ions, phosphate ions, and magnesium ions in the form of salts to said ammonium nitrate and thereafter prilling said ammonium nitrate to produce a granular product, the quantity of said ions added to said ammonium nitrate being such that the content of phosphorus calculated as $P_2O_5$, the content of sodium calculated as $Na_2O$, and the content of magnesium calculated as MgO in the product each amounts to between 0.3 and 1% with reference to the dry ammonium nitrate.

References Cited in the file of this patent

UNITED STATES PATENTS

| | | |
|---|---|---|
| 1,868,890 | Eyer et al. | July 26, 1932 |
| 1,932,434 | Wyler | Oct. 31, 1933 |
| 2,280,451 | Riddle | Apr. 21, 1942 |
| 2,382,298 | Datin | Aug. 14, 1945 |
| 2,590,054 | Taylor | Mar. 18, 1952 |
| 2,943,928 | Guth | July 5, 1960 |
| 3,021,207 | Stengel | Feb. 13, 1962 |
| 3,030,179 | McFarlin et al. | Apr. 71, 1962 |
| 3,034,858 | Vines | May 15, 1962 |

FOREIGN PATENTS

| | | |
|---|---|---|
| 573,147 | Great Britain | Nov. 8, 1945 |